United States Patent
Dabak et al.

(10) Patent No.: US 8,693,575 B2
(45) Date of Patent: *Apr. 8, 2014

(54) WIRELESS PRECODING METHODS

(75) Inventors: Anand G. Dabak, Plano, TX (US); Eko N. Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,543

(22) Filed: Sep. 20, 2011

(65) Prior Publication Data

US 2012/0008718 A1    Jan. 12, 2012

Related U.S. Application Data

(63) Continuation of application No. 11/199,629, filed on Aug. 9, 2005, now Pat. No. 8,023,589.

(60) Provisional application No. 60/599,935, filed on Aug. 9, 2004.

(51) Int. Cl.
    *H04L 27/36* (2006.01)

(52) U.S. Cl.
    USPC ........... 375/298; 375/295; 375/259; 375/260; 375/261

(58) Field of Classification Search
    USPC ................... 375/295, 298, 259, 260, 261
    See application file for complete search history.

(56) References Cited

U.S. PATENT DOCUMENTS

| | | | |
|---|---|---|---|
| 6,760,882 B1 | 7/2004 | Gesbert et al. | |
| 7,315,577 B2 * | 1/2008 | Shao | 375/260 |
| 7,356,090 B2 | 4/2008 | Hwang et al. | |
| 7,372,912 B2 | 5/2008 | Seo et al. | |
| 7,577,209 B2 * | 8/2009 | Poon | 375/267 |
| 7,873,021 B2 * | 1/2011 | Petre et al. | 370/342 |
| 7,929,632 B2 * | 4/2011 | Shao | 375/267 |
| 8,023,589 B2 * | 9/2011 | Onggosanusi et al. | 375/299 |
| 2003/0125002 A1 | 7/2003 | Harrison | |
| 2003/0235255 A1 | 12/2003 | Ketchum et al. | |
| 2004/0002364 A1 | 1/2004 | Trikkonen et al. | |

(Continued)

OTHER PUBLICATIONS

Ikram, Muhammad Z., et al., U.S. Appl. No. 11/182,083, filed Jul. 1, 2005, entitled "Method and Apparatus for Providing Closed Loop Transmit Precoding" 19 pages.

(Continued)

*Primary Examiner* — Kenneth Lam
(74) *Attorney, Agent, or Firm* — Ronald O. Neerings; Wade James Brady; Frederick J. Telecky, Jr.

(57) ABSTRACT

Various wireless precoding systems and methods are presented. In some embodiments, a wireless transmitter comprises an antenna precoding block, a transform block, and multiple transmit antennas. The antenna precoding block receives frequency coefficients from multiple data streams and distributes the frequency coefficients across multiple transmit signals in accordance with frequency-dependent matrices. The transform block transforms the precoded frequency coefficients into multiple time domain transmit signals to be transmitted by the multiple antennas. The frequency coefficients from multiple data streams may be partitioned into tone groups, and all the frequency coefficients from a given tone group may be redistributed in accordance with a single matrix for that tone group. In some implementations, the frequency coefficients within a tone group for a given data stream may also be precoded. In some alternative embodiments, tone group precoding may be employed in a single channel system.

11 Claims, 11 Drawing Sheets

(56) References Cited

U.S. PATENT DOCUMENTS

| | | |
|---|---|---|
| 2004/0185909 A1 | 9/2004 | Alexiou et al. |
| 2005/0101259 A1 | 5/2005 | Tong et al. |
| 2005/0128936 A1 | 6/2005 | Shao |
| 2005/0152473 A1 | 7/2005 | Maltsev et al. |
| 2005/0287978 A1* | 12/2005 | Maltsev et al. ............... 455/403 |
| 2006/0039489 A1* | 2/2006 | Ikram et al. .................. 375/260 |
| 2007/0263735 A1 | 11/2007 | Tong et al. |
| 2008/0108310 A1 | 5/2008 | Tong et al. |

OTHER PUBLICATIONS

Palomar, Daniel P., et al., "Optimum Linear Joint Transmit-Receive Processing for MIMO Channels with QoS Constraints", 36th Asilomar Conference on Signals, Systems and Computers, Pacific Grove, CA., Nov. 2002, Revised Feb. 24, 2004, 32 pgs.

* cited by examiner

WIRELESS PRECODING METHODS

CROSS-REFERENCE TO RELATED APPLICATIONS

This application is a Continuation of application Ser. No. 11/199,629 filed Aug. 9, 2005, which is a non-provisional application claiming priority to U.S. Provisional Application Ser. No. 60/599,935 filed on Aug. 9, 2004, entitled "Closed Loop Techniques for MIMO And Constellation Pre-Rotation For OFDM," which is hereby incorporated by reference. This application also relates to U.S. patent application Ser. No. 11/182,083, filed on Jul. 1, 2005, entitled "Method And Apparatus For Providing Closed-Loop Transmit Precoding," which is hereby incorporated by reference herein.

BACKGROUND

Multiple Input, Multiple Output (MIMO) refers to the use of multiple transmitters and receivers (multiple antennas) on wireless devices for improved performance. When two transmitters and two or more receivers are used, two simultaneous data streams can be sent, thus doubling the data rate. Various wireless standards that are based on MIMO orthogonal frequency-division multiplexing (OFDM) technology use an open loop mode of operation. In the open-loop MIMO mode of operation, the transmitter assumes no knowledge of the communication channel. Although the open-loop MIMO mode may be simpler to implement, it suffers performance issues. An alternative to open-loop mode is closed-loop processing, whereby channel-state information is referred from the receiver to the transmitter to precode the transmitted data for better reception. Closed-loop operation offers improved performance over open-loop operation, though not free of cost. The transmission of channel-state information from the receiver to the transmitter involves significant overhead. It is desirable, therefore, to design a reduced-feedback closed-loop mode of operation with the performance similar to that obtained using the full channel-state information feedback.

SUMMARY

Accordingly, there is disclosed herein various wireless precoding systems and methods. In some embodiments, a wireless transmitter comprises an antenna precoding block, a transform block, and multiple transmit antennas. The antenna precoding block receives frequency coefficients from multiple data streams and distributes the frequency coefficients across multiple transmit signals in accordance with frequency-dependent matrices. The transform block transforms the precoded frequency coefficients into multiple time domain transmit signals to be transmitted by the multiple antennas. The frequency coefficients from multiple data streams may be partitioned into tone groups, and all the frequency coefficients from a given tone group may be redistributed in accordance with a single matrix for that tone group. In some implementations, the frequency coefficients within a tone group for a given data stream may also be precoded. In some alternative embodiments, tone group precoding may be employed in a single channel system.

DETAILED DESCRIPTION

Figure 1:
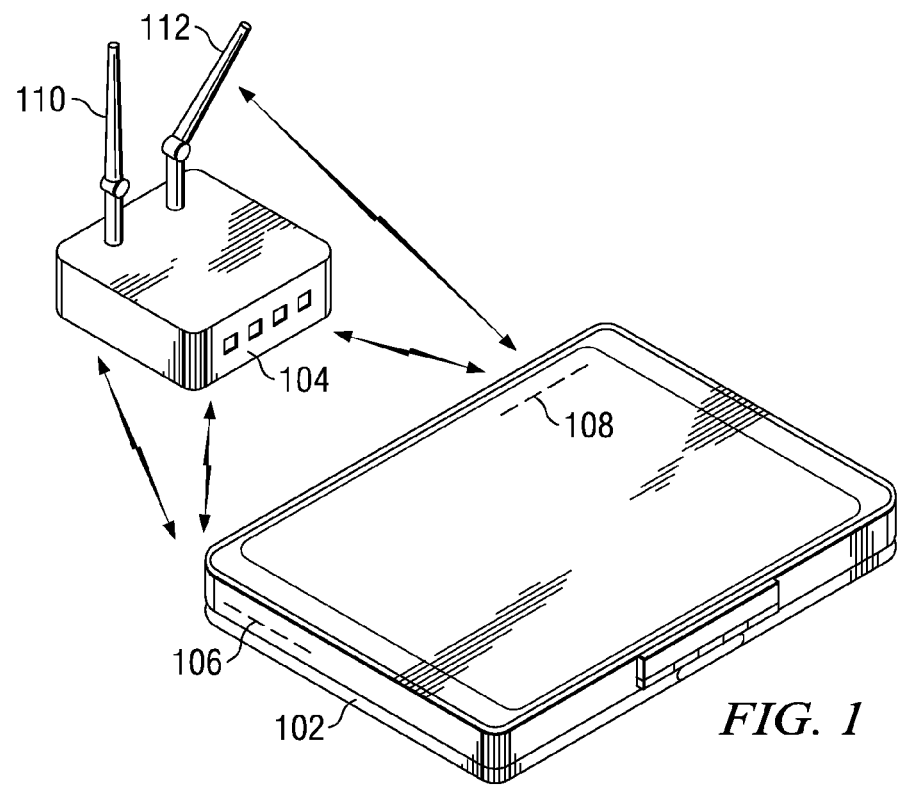
FIG. 1 shows an illustrative multiple input, multiple output (MIMO) system.

FIG. 1 shows a portable digital device 102 that communicates wirelessly with a second digital device 104. Portable digital device 102 can be any one or more of the following example devices: a tablet computer, a laptop computer, a personal digital assistant ("PDA"), a mobile phone, a portable digital music player, a digital camera, and a remote control. Second digital device 104 can be any one or more of the following example devices: a wireless network base station, a host computer; a mobile phone base station, a home appliance, and a second portable digital device.

Portable digital device 102 includes two or more antennas 106, 108. (In FIG. 1, antennas 106, 108 are embedded in the chassis of device 102.) Similarly, the second digital device 104 includes two or more antennas 110, 112. Each antenna 106-112 can transmit and receive to exchange wireless signals with every other antenna, though one or more of the channels may be more highly attenuated than other channels. At the high frequencies of interest, frequency-selective fading that varies from channel to channel may be expected as a matter of course.

A multiple input, multiple output (MIMO) system such as that shown in FIG. 1 can be modeled mathematically using vectors to represent the transmit signal set and the receive signal set. If the components of vector $s=[s_1, s_2, K, s_P]^T$ represent the current or voltage transmit signal values applied to the transmit antennas at a given instant, and the components of vector $r=[r_1, r_2, K, r_Q]^T$ represent the current or voltage receive signal values responsively produced in the receive antennas, the MIMO signal model can be expressed as $$r = \sum_{p=1}^{P} h_p s_p + w = Hs + w,$$

where $h_i=[h_{1i}, h_{2i}, K, h_{Qi}]^T$ is a Q-dimensional vector containing channel coefficients from ith transmitter to Q receivers, $H=[h_1, h_2, K, h_P]$ is the Q×P channel matrix, and $w=[w_1, w_2, K, w_Q]^T$ is the Q-dimensional vector of zero-mean noise with variance $\sigma^2$. The received signal can be processed by using either an optimal maximum-likelihood method or a sub-optimal method, such as zero-forcing or linear minimum mean squared error (MMSE) processing. See D. P. Palomar, M. A. Lagunas, and J. M. Cioffi, "Optimum Linear Joint Transmit-Receive Processing for MIMO Channels with QoS Constraints", which is hereby incorporated by reference, for examples of suitable receiver design techniques.

Figure 2:
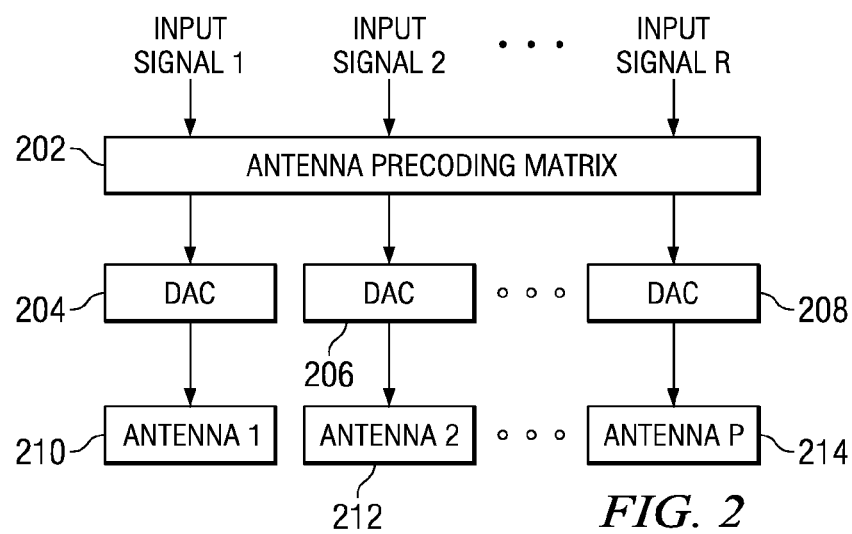
FIG. 2 is a function block diagram of an illustrative open loop MIMO system with antenna precoding.

FIG. 2 shows a precoding technique (also termed "rotation" or "pre-rotation") in which input signals are distributed over multiple transmit antennas. Precoding may be used to compensate for (or even to exploit) interference between the multiple transmit signals. In block 202, R input signals are distributed across P transmit signals. Each digital-to-analog converter (DAC) 204, 206, 208, converts a respective transmit signal to analog form and applies the transmit signal to a respective transmit antenna 210, 212, 214. The precoding operation can be represented as the following matrix multiplication $$s=Vd,$$

where $d=[d_1, d_2, K, d_R]^T$ is the R-dimensional vector of input signals to be transmitted, and V is the P×R antenna precoding matrix.

The antenna precoding matrix V may be tailored to maximize the channel capacity, but of course this requires some knowledge or assumptions about the channel. For the open loop case, V may be simply a P×P identity matrix. Nevertheless, this model enables consideration of closed-loop and open-loop options within the same framework, and further enables consideration of situations in which the number of transmit antennas is greater than or equal to the number of input signals. With precoding, the effective (rotated) channel matrix is denoted by $$H^r=HV.$$

Figure 3A:
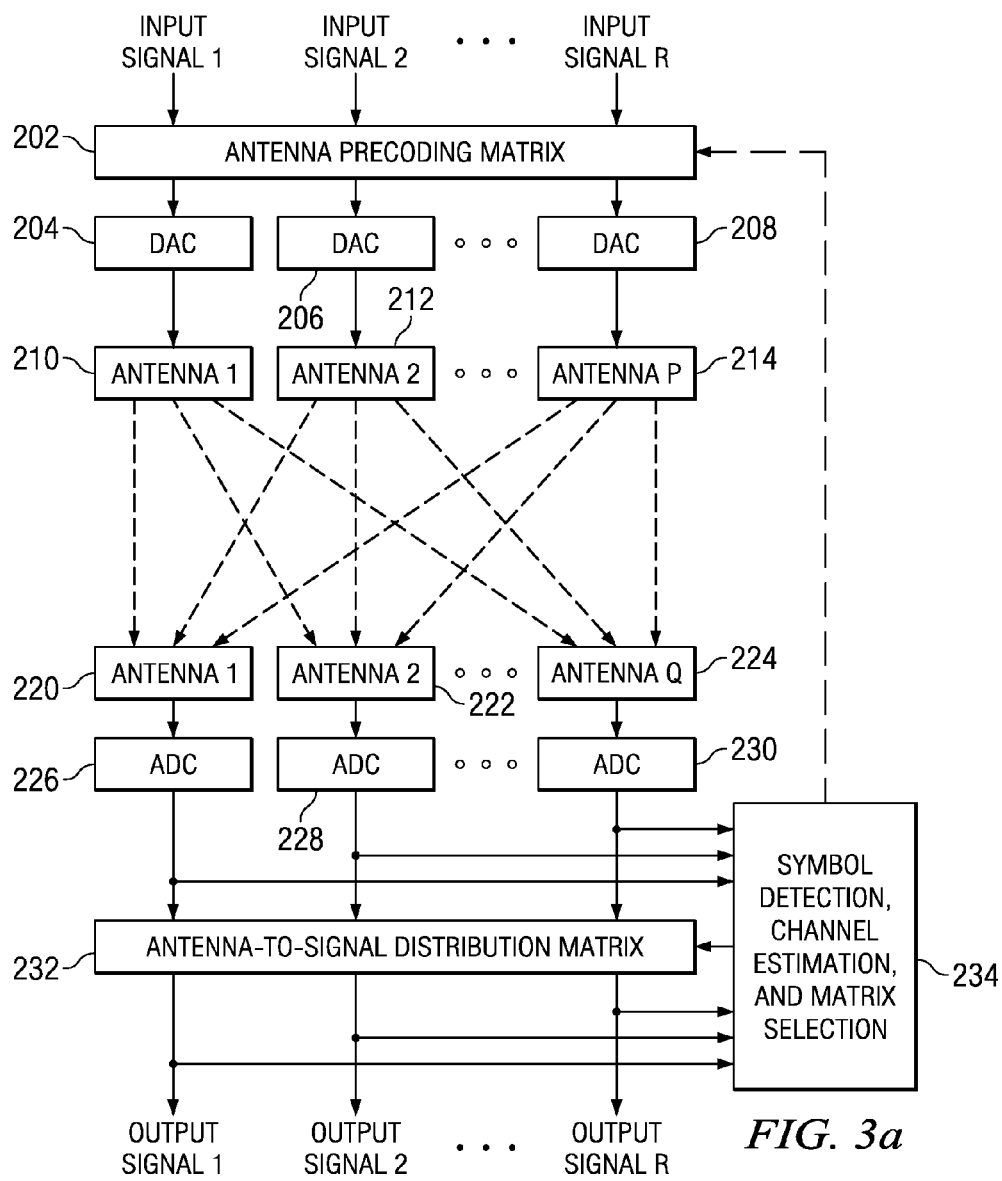
FIG. 3*a* is a function block diagram of an illustrative closed loop MIMO system with antenna precoding.

FIG. 3a shows antenna precoding in a closed loop MIMO system. The P transmit antennas 210-214 send signals that are detected by Q receive antennas 220-224. Each receive antenna 220-224 produces a receive signal that is digitized by a corresponding analog-to-digital converter (ADC) 226-230. The ADCs 226-230 may each include amplifiers and signal filters to ensure an adequate signal-to-noise ratio of the digitized signals. In block 232, the energy of the receive signals is redistributed to form R output signals that correspond to the R input signals. A distribution matrix U inverts the operations of the effective channel matrix $H^r$ to estimate the input signals:

$$\hat{d}=Ur=U(HVd+w),$$

If perfect channel state information is available at the transmitter, then the transmitted symbols can be precoded with the eigenvectors V of the matrix $H^H H$, where $(\bullet)^H$ denotes conjugate transposition. Alternative precoding and redistribution matrices V and U can be selected as provided in the Palomar reference cited previously, or as provided in U.S. patent application Ser. No. 11/182,083, filed on Jul. 1, 2005, entitled "Method And Apparatus For Providing Closed-Loop Transmit Precoding". Block 234 performs precoding and redistribution matrix selection based on channel estimation. The channel estimation may include estimating the input signals (from the output signals) and determining the relationship between the received signals and the estimated input signals. The channel estimation may be performed once when a communication link is established, or may be redetermined periodically, or may be continuously tracked. The matrix selections may similarly be made once, periodically, or continuously updated.

The precoding matrix selection is communicated from the receiver to the transmitter by a return channel as indicated by the dashed line. The precise nature of the return channel from the receiver to the transmitter is unimportant, and many suitable alternatives exist. For example, a separate communications channel may exist between the receiver and transmitter, or the transmitter and receiver may conduct half-duplex or full-duplex communications across the wireless MIMO channel currently under discussion. Nevertheless, to minimize the bandwidth requirements for the return channel, it is desirable to minimize the number of bits used to communicate the selected precoding matrix to the transmitter.

Figure 3B:
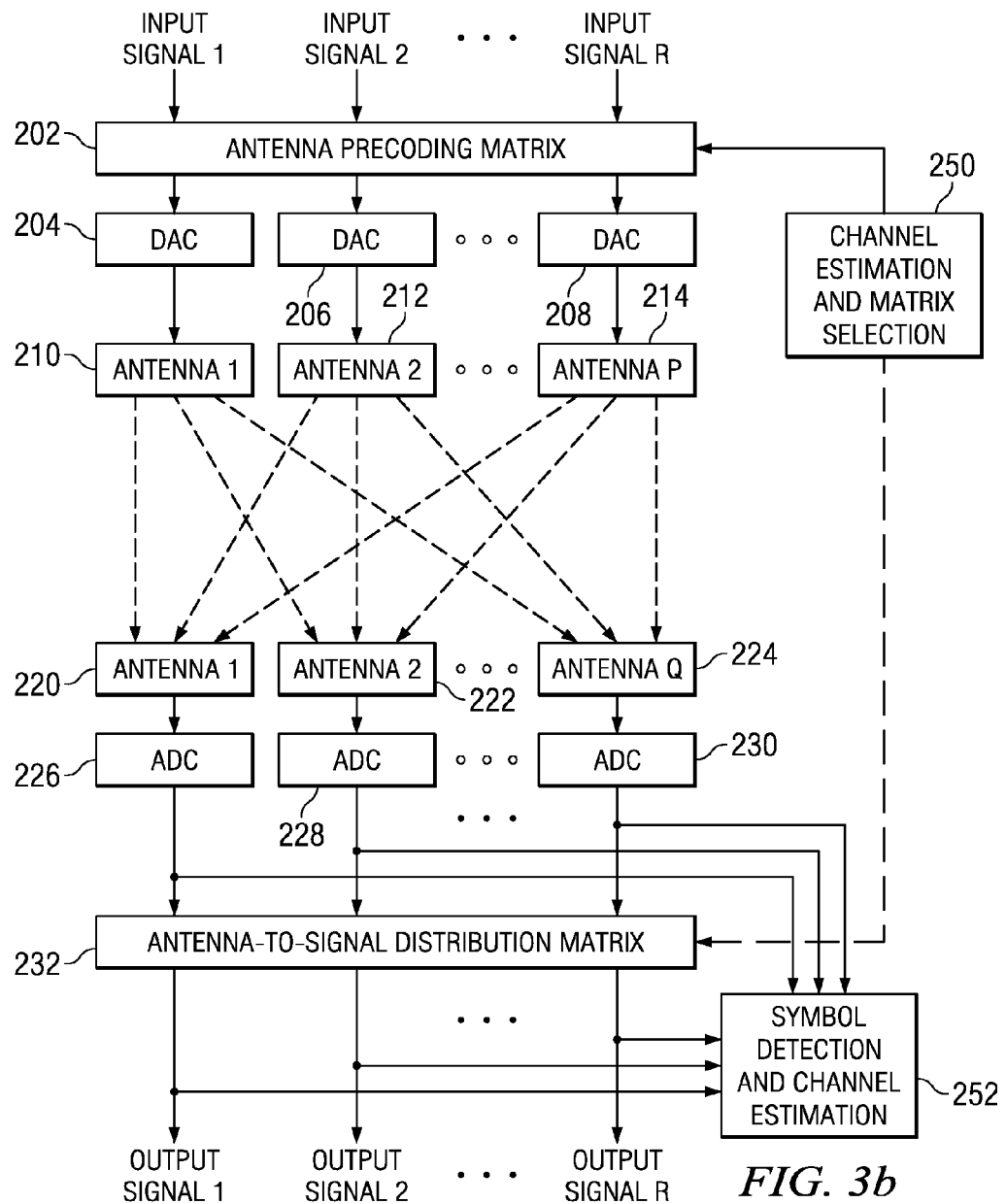
FIG. 3*b* is a function block diagram of an illustrative alternative closed loop MIMO system with antenna precoding.

FIG. 3b shows an alternative closed loop system configuration. In block 250, the transmitter performs precoding and redistribution matrix selection based on an estimation of the channel transfer function. The channel estimation may be determined by the receiver (e.g., in block 252) and communicated to the transmitter by return channel. Alternatively, the transmitter may determine the channel estimation, e.g., based on duplex communications from the receiver. In this configuration, the selected redistribution matrix is communicated to the receiver, potentially via the wireless MIMO channel. Alternatively, a separate channel may be used to communicate the matrix selection to the receiver. The separate channel can take the form of a narrowband signal broadcast from a single antenna at a frequency that is dedicated to carrying configuration information to the receiver.

Figure 4:
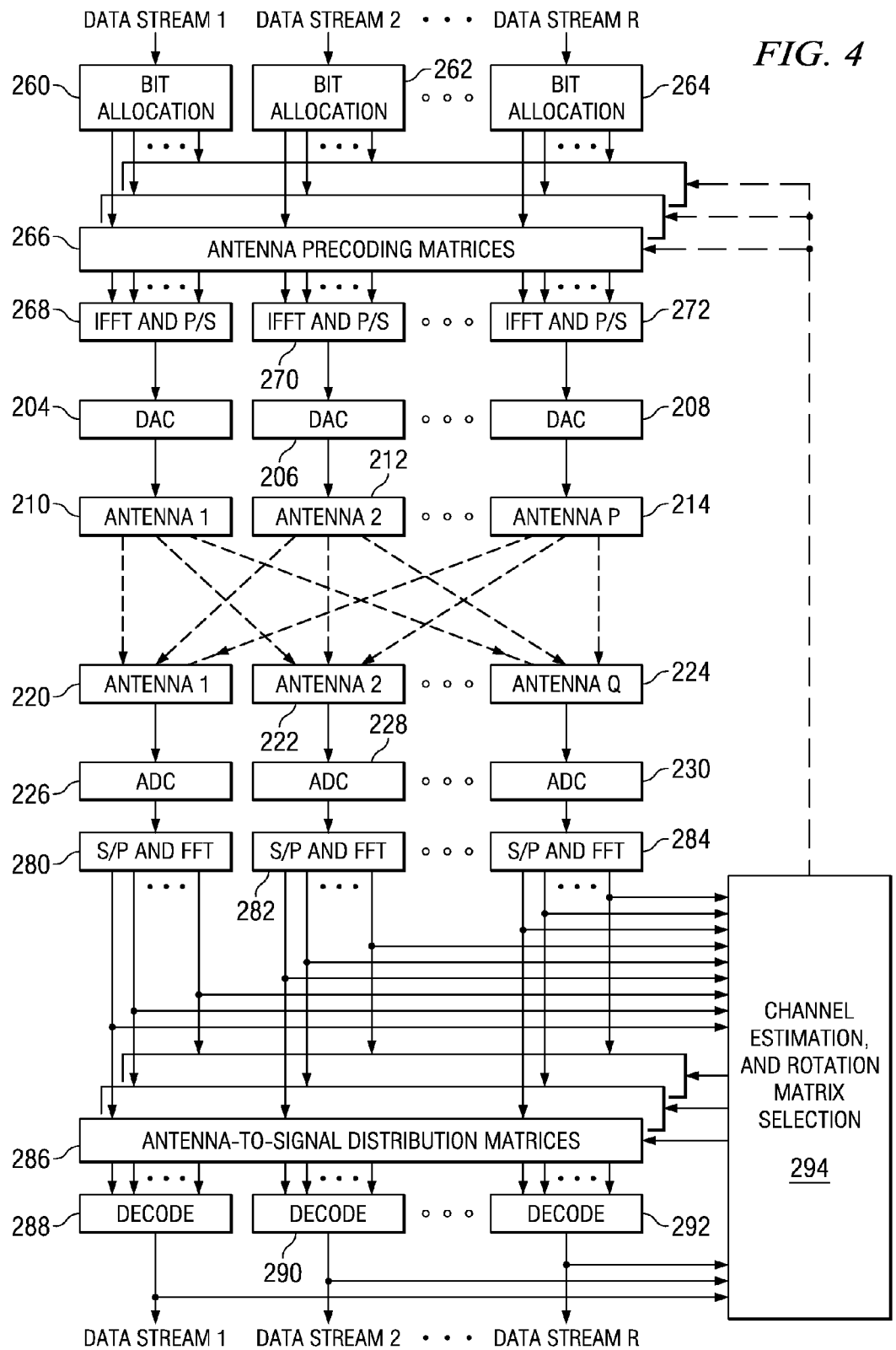
FIG. 4 is a function block diagram of an illustrative closed loop MIMO system with antenna precoding in the frequency domain.

FIG. 4 shows a broadband MIMO system that employs antenna precoding. The illustrative system of FIG. 4 employs orthogonal frequency division multiplexing (OFDM) to distribute data bits among evenly-spaced carrier frequencies, or "tones". For each of the R data streams, a corresponding bit allocation block 260, 262, 264 apportions bits among the available tones. As in other OFDM systems, the allocation of bits may be dynamic based on the measured signal-to-noise ratio for each tone. The bit allocation blocks 260-264 each provide a quadrature amplitude modulation (QAM) constellation signal point for each tone.

Because of the channel's frequency dependence, a separate antenna precoding matrix 266 may be provided for each tone. The resulting frequency coefficients for each tone i are $$f_i=V_i d_i,$$

where $f_i$ is an P-dimensional vector of frequency coefficients on the ith tone for each antenna, $V_i$ is the P×R antenna precoding matrix for the ith tone, and $d_i$ is the R-dimensional vector of input signal constellation points for the ith tone. However, the channel's frequency dependence is expected to be small for adjacent tones, and accordingly, some embodiments group adjacent tones together and apply one antenna precoding matrix 266 to each tone group. For example, an illustrative embodiment divides 256 available tones into 32 groups of eight tones each, and accordingly, only 32 antenna precoding matrices are employed. Each antenna precoding matrix is applied to each tone in a given tone group to distribute that tone's energy in a nearly-optimal way across the multiple transmit antennas 210-214. The set of antenna precoding matrices 266 produce a set of frequency coefficients for each transmit signal. Each set of frequency coefficients is transformed into a time-domain digital signal by inverse fast Fourier Transform (IFFT) and parallel-to-serial conversion (P/S) blocks 268-272. The time-domain digital signals are converted by DACs 204-208 and transmitted via transmit antennas 210-214.

The receiver includes serial-to-parallel conversion (S/P) and fast Fourier Transform (FFT) blocks 280-284 to convert digital receive signals from the ADCs 220-224 into frequency domain receive signals. A set of signal distribution matrices 286 inverts the effects of the channel and antenna precoding matrices 266, yielding $$\hat{d}_i = U_i g_i = U_i(H_i V_i d_i + w_i)$$

where $g_i$ is an Q-dimensional vector of frequency coefficients on the ith tone for each receive antenna, $U_i$ is the R×Q signal distribution matrix for the ith tone, $H_i$ is the Q×P channel response matrix for the ith tone, and $w_i$ is the Q-dimensional vector of channel distortion on the ith tone. Decoder blocks 288-292 extract the bit information from the output signal frequency coefficients. Channel estimation and matrix selection block 294 estimates the channel transfer function and selects the precoding and distribution matrix sets accordingly.

Though FIG. 4 shows one closed loop embodiment, alternative embodiments exist having an open loop implementation or an alternative closed-loop implementation like that described in relation to FIG. 3*b*. This observation also holds true for the other precoding methods and systems disclosed hereafter.

Figure 5:
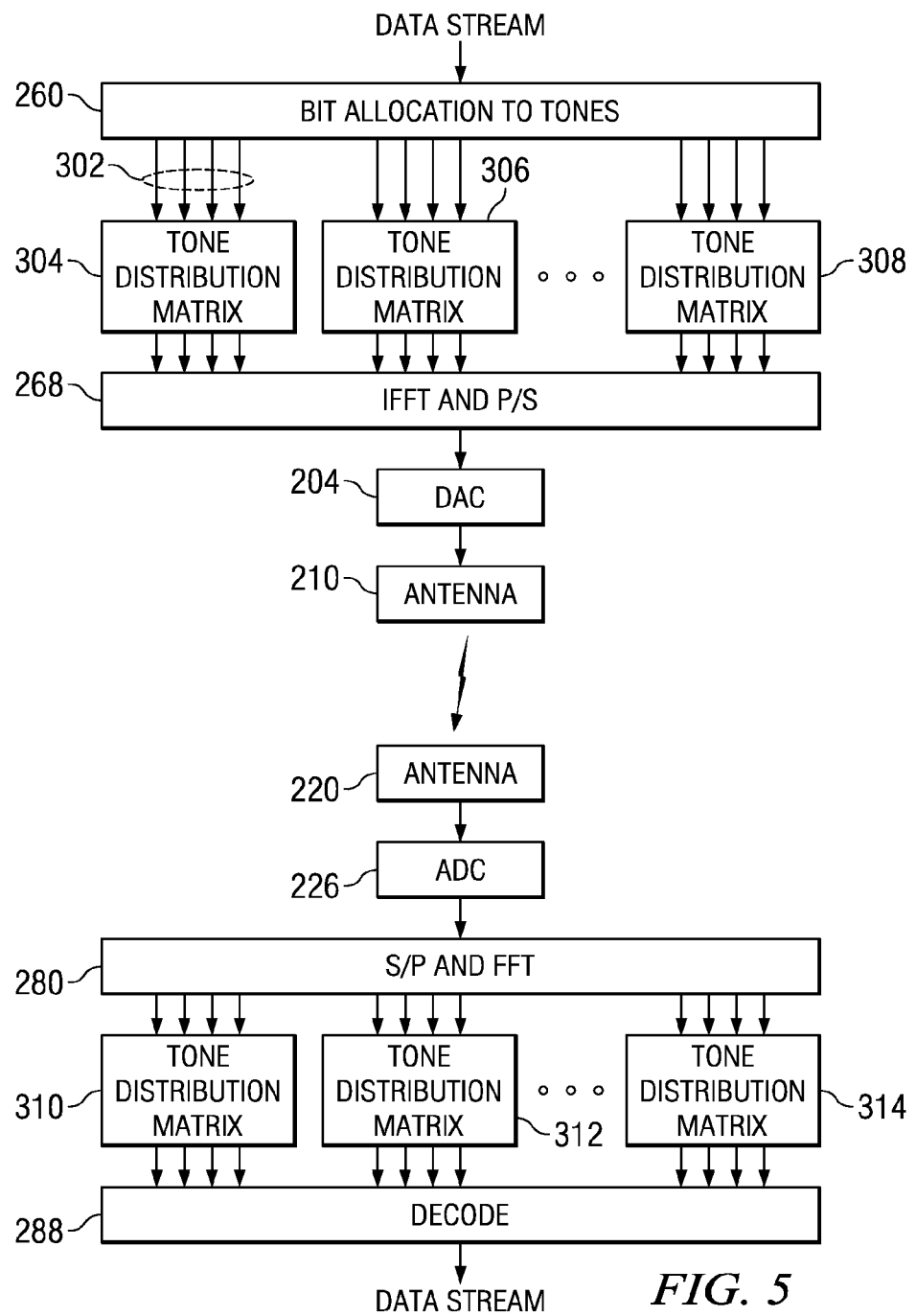
FIG. 5 is a function block diagram of an illustrative open loop orthogonal frequency division multiplexing (OFDM) system with tone group precoding.

FIG. 5 shows tone precoding in an open loop system. The constellation signal points from bit allocation block 260 are partitioned into tone groups 302. The signal energy for each tone is distributed across the tone group by a tone group precoding block 304, 306, or 308. The tone group precoding may be performed in accordance with the following equation:

$$f^j = T^j d^j$$

where $f^j$ is an N-dimensional vector of frequency coefficients in the jth tone group for each antenna, is the N×N antenna precoding matrix for the jth tone group, and $d^j$ is an N-dimensional vector of input signal constellation points for the jth tone group. The outputs of the tone group precoding blocks are taken as a set of frequency coefficients by IFFT and P/S block 268, which converts them into a time domain digital signal for DAC 204. DAC 204 then drives an analog signal to transmit antenna 210.

Receive antenna 220 provides its received signal to ADC 226, which converts the receive signal to digital form. Block 280 transforms the digital signal into the frequency domain, and blocks 310-314 operate on the tone groups to invert the effects of the channel and of precoding blocks 304-308. A decode block 288 extracts the data from the frequency coefficient values in accordance with the following equation:

$$\hat{d}^j = S^j g^j = S^j(H^j T^j d^j + w^j)$$

where $g^j$ is an N-dimensional vector of frequency coefficients on the jth tone group, $S^j$ is the N×N signal distribution matrix for the jth tone group, $H^j$ is the N×N channel response matrix for the jth tone group, and $w^j$ is the N-dimensional vector of channel distortion on the jth tone group.

Figure 6:
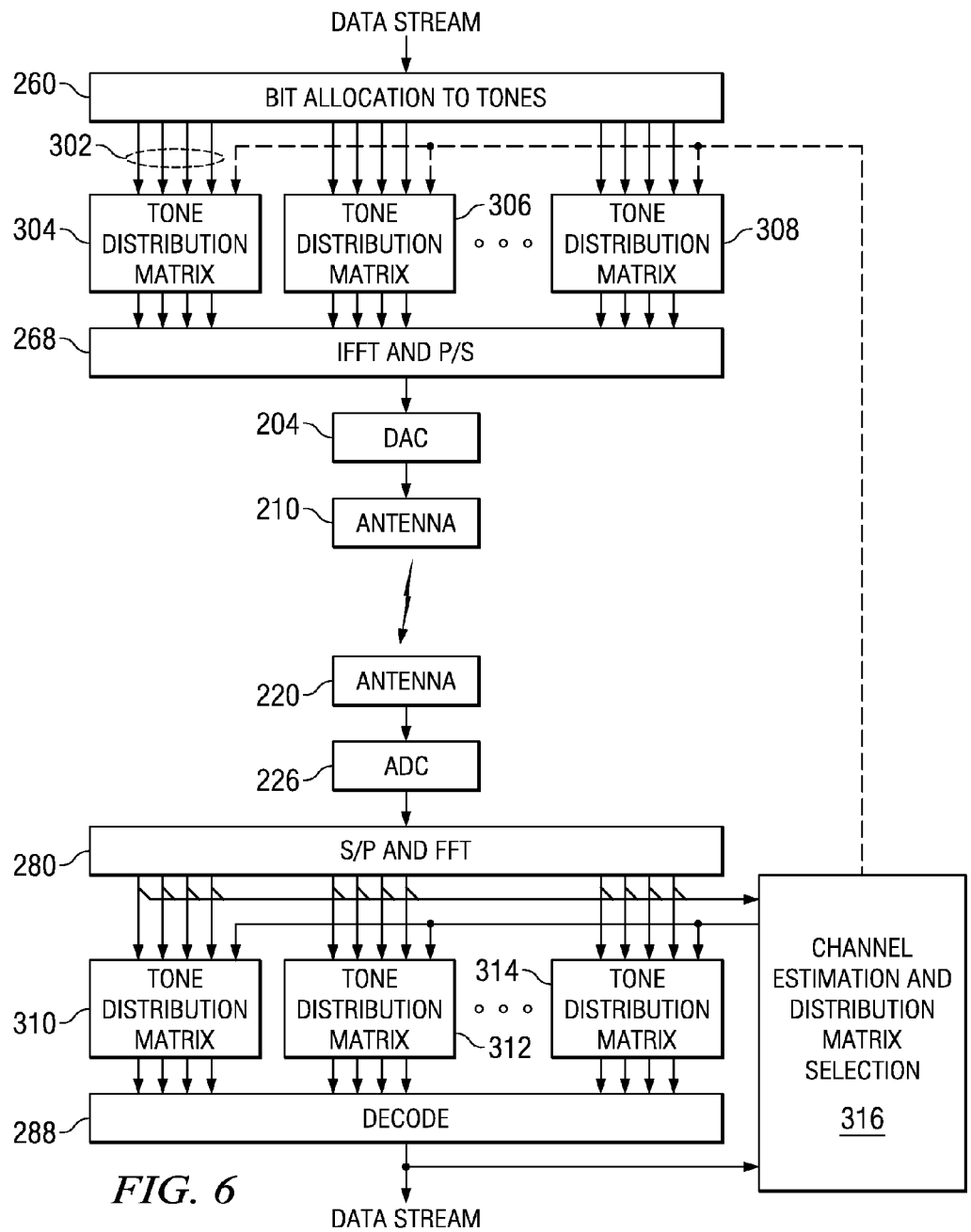
FIG. 6 is a function block diagram of an illustrative closed loop OFDM system with tone group precoding.

FIG. 6 shows tone group precoding in a closed loop system. The closed loop system includes the elements of FIG. 5, and further includes a block 316 to estimate the channel transfer function and select the tone group precoding matrices and the tone group signal distribution matrices The channel estimation may be performed once when a communication link is established, or may be redetermined periodically, or may be continuously tracked. The matrix selections may similarly be made once, periodically, or continuously updated.

Figure 7:
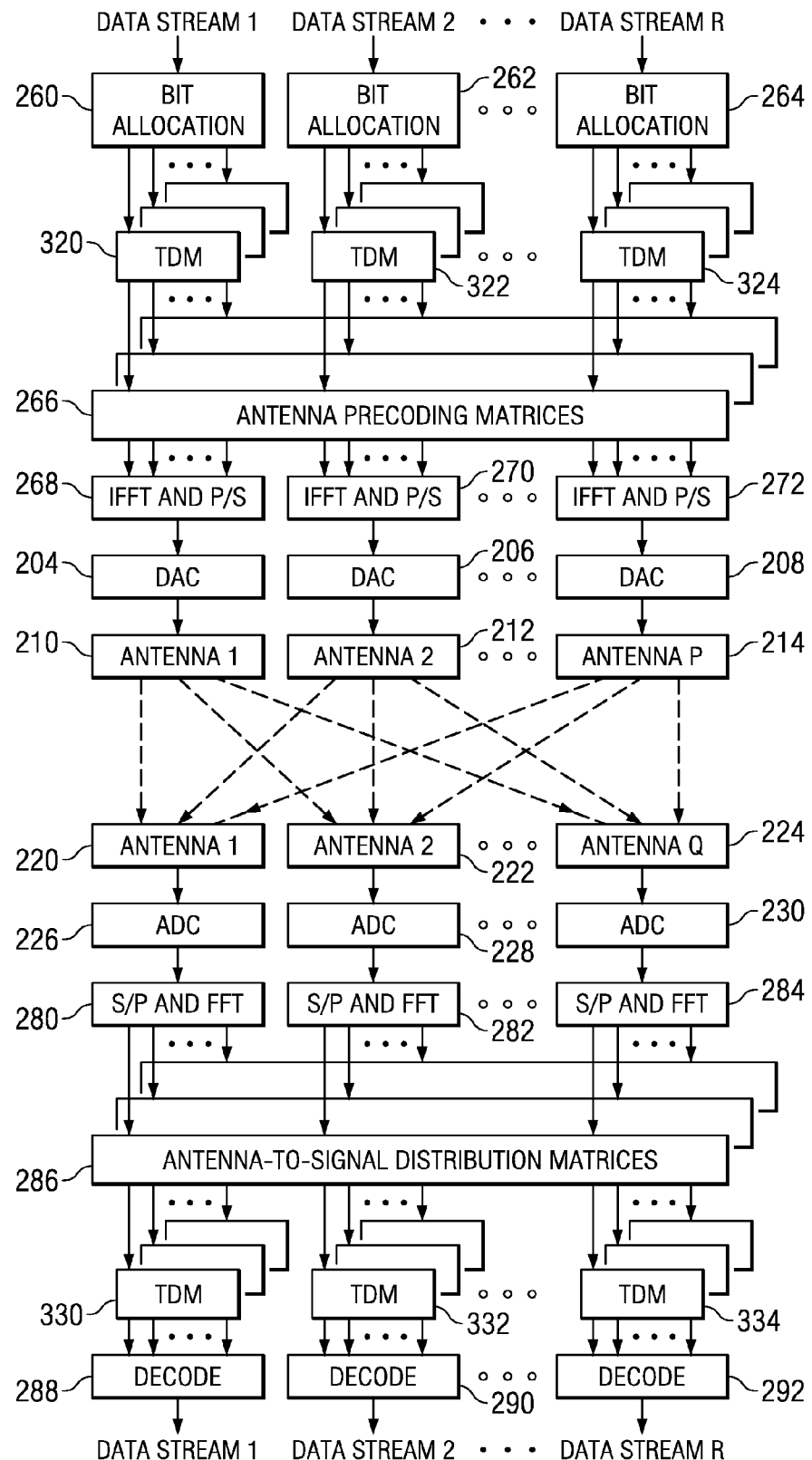
FIG. 7 is a function block diagram of an illustrative open loop MIMO OFDM system with antenna and tone group precoding.

FIG. 7 shows a MIMO system having both tone group precoding and antenna precoding. A set of tone group precoding matrices is provided in blocks 320, 322, and 324, to distribute signal energy across the tone groups for each of multiple data streams. The outputs of the tone group precoding blocks are then taken as the frequency coefficients for multiple transmit signals, and precoded across multiple antennas by a set of antenna precoding matrices 266. In this manner, the data bits are distributed across multiple frequencies and multiple antennas (multiple transmission paths) to provide a high degree of resistance to fading while maximizing the communications bandwidth of the system.

The frequency coefficients output by block 266 are transformed to the time domain by IFFT blocks 268-272, converted to analog signals by DACs 204-208, and transmitted by antennas 210-214. On the receive side, antennas 220-224 provide analog receive signals to ADCs 226-230, which digitize the receive signals. The digitized receive signals are transformed by FFT blocks 280-284 to obtain the frequency coefficients of multiple receive signals. Signal distribution matrices 286 extract multiple data stream signals from the different receive signals, and tone group distribution matrices 330-334 invert the operation of blocks 320-324 to obtain constellation signals. Decode blocks 288-292 then extract data streams from the constellation signals.

Figure 8:
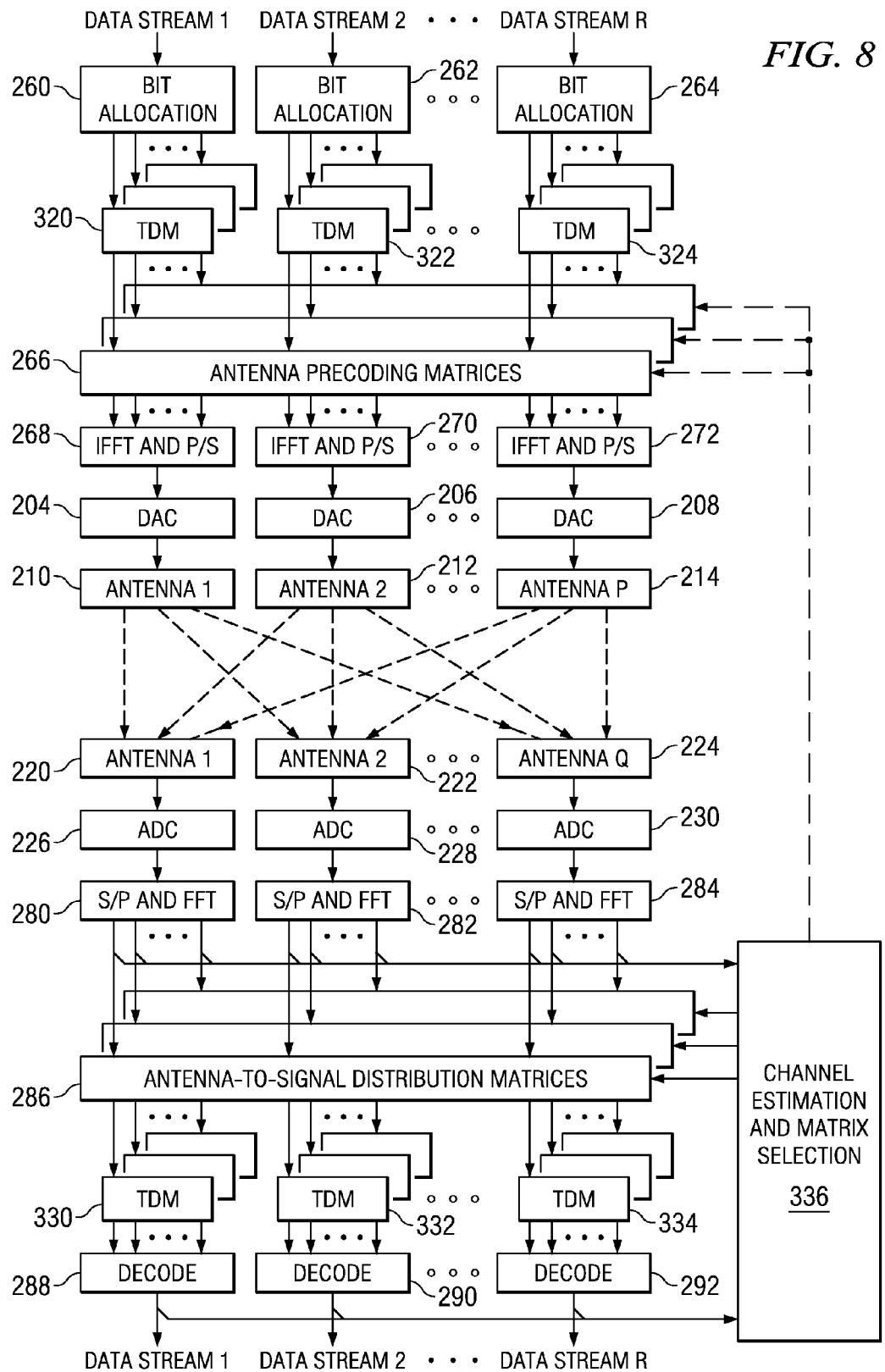
FIG. 8 is a function block diagram of an illustrative MIMO OFDM system with closed loop antenna precoding and open loop tone group precoding.

The system shown in FIG. 7 is an open loop system, in which the matrices have been designed for a known or predefined range of assumed channels. FIG. 8 shows a system having closed loop selection of antenna precoding and redistribution matrices, and open-loop predetermined tone group precoding and redistribution matrices. Block 336 performs antenna precoding and redistribution matrix selection based on channel estimation. The channel estimation may include estimating the input signals (from the output data streams) and determining the relationship between the received signals and the estimated input signals. The channel estimation may be performed once when a communication link is established, or may be re-determined periodically, or may be continuously tracked. The matrix selections may similarly be made once, periodically, or continuously updated.

Figure 9:
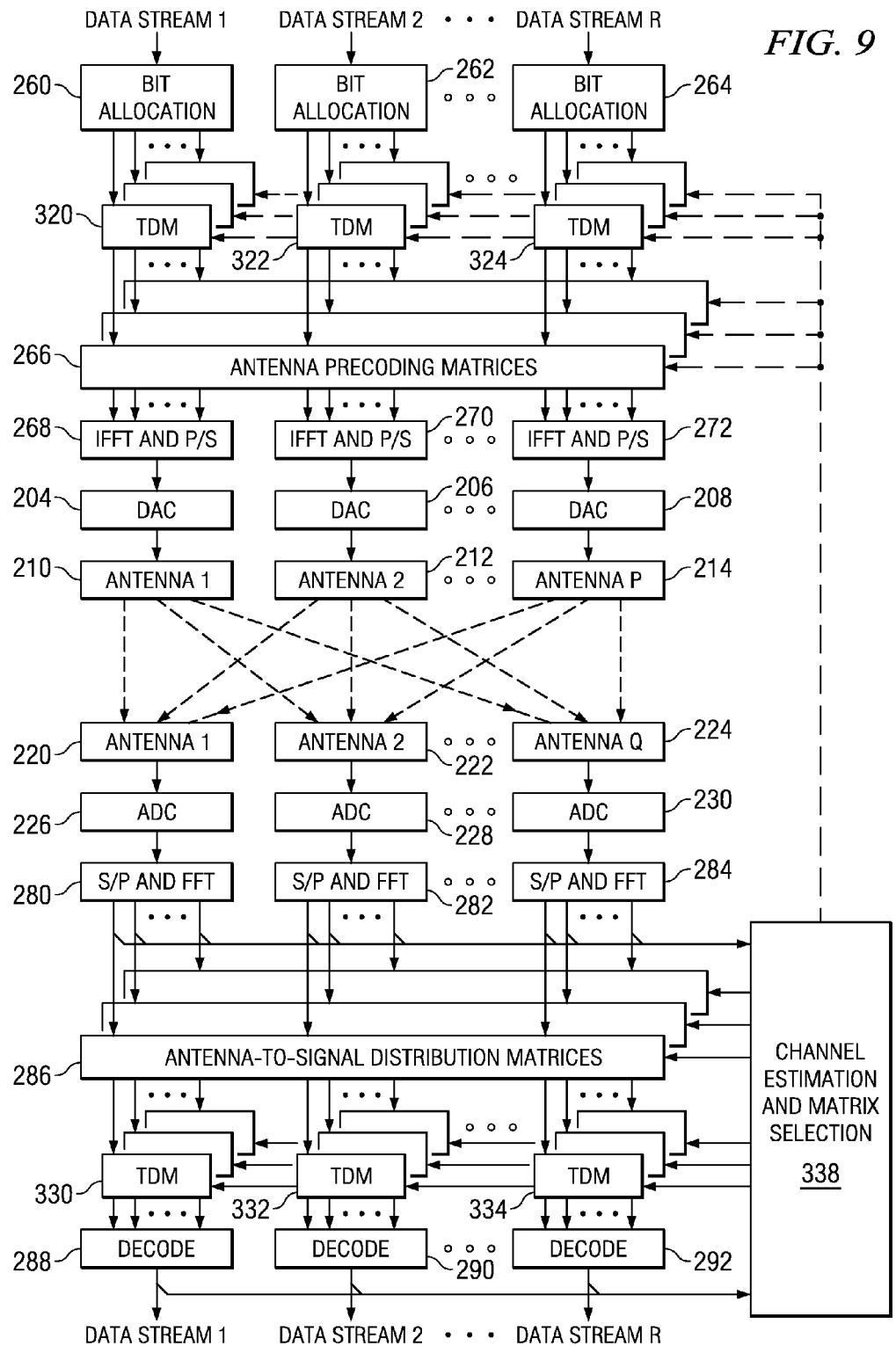
FIG. 9 is a function block diagram of an illustrative MIMO OFDM system with closed loop antenna precoding and closed loop tone group precoding.

FIG. 9 shows a MIMO system having closed loop selection of both antenna and tone group precoding matrices. Block 338 performs channel estimation and selection of both antenna and tone group precoding and distribution matrices based on the channel estimation.

Figure 10:
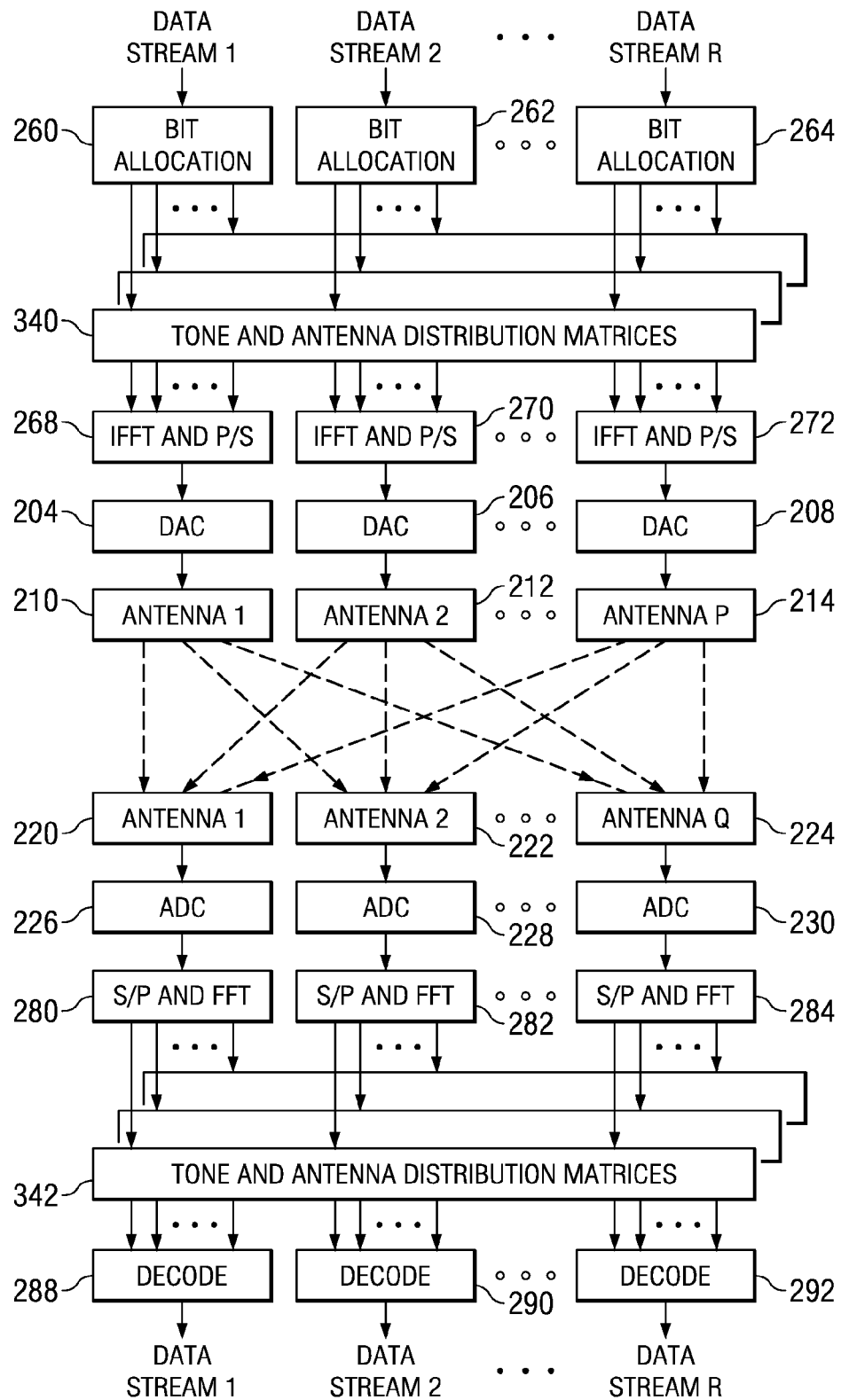
FIG. 10 is a function block diagram of an illustrative open loop MIMO OFDM system with combined antenna and tone group precoding.

FIG. 10 shows a MIMO system having combined open loop antenna and tone group precoding. A set of combined precoding matrices 340 (one matrix per tone group) takes the frequency coefficients for each tone group and redistributes the signal energy over the tone group and the multiple antennas. On the receiving end, a set of combined distribution matrices 342 inverts the combined effect of the channel and matrices 340 to reconstruct the frequency coefficients that are then decoded by decode blocks 228-292.

Figure 11:
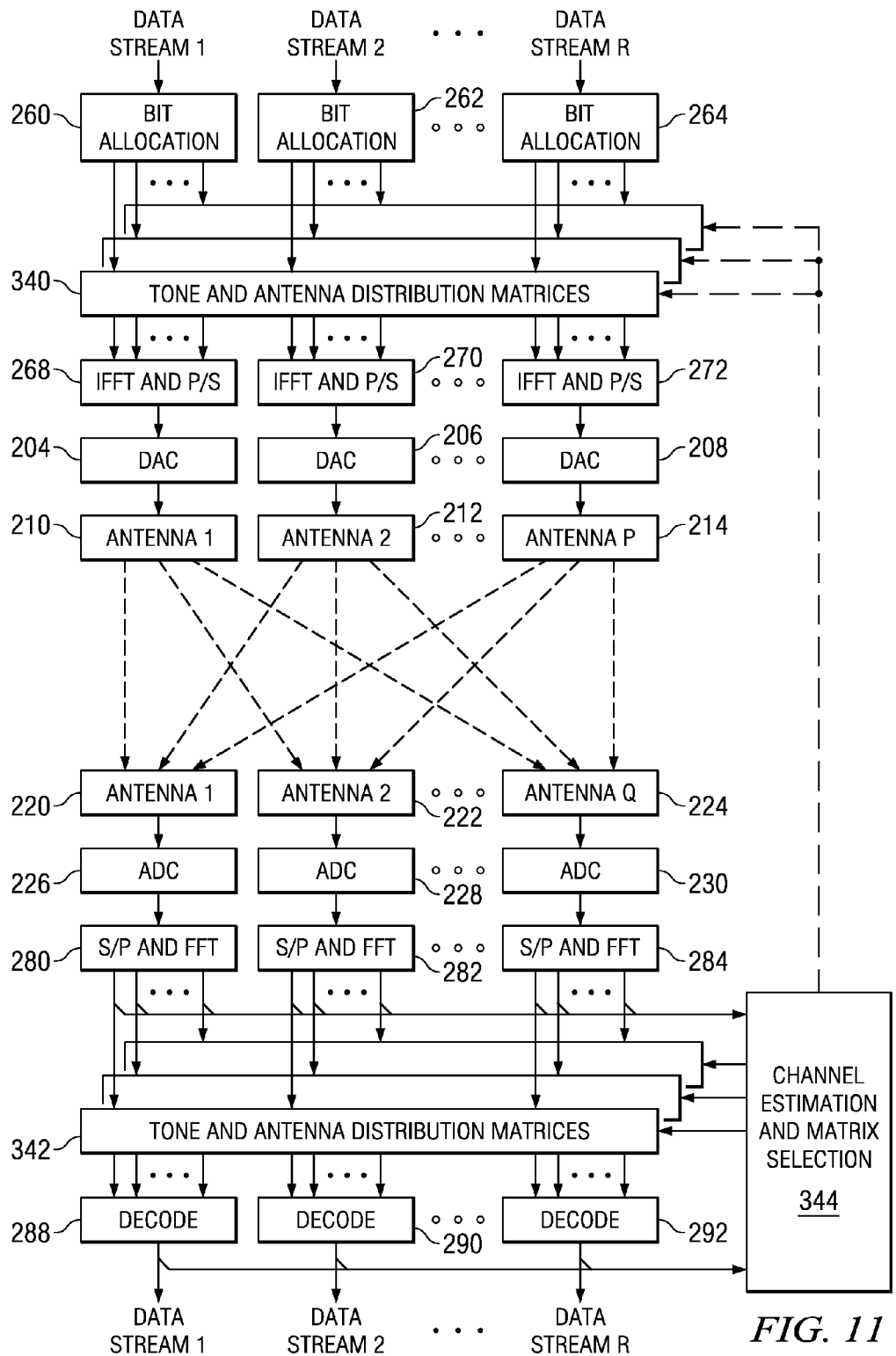
FIG. 11 is a function block diagram of an illustrative closed loop MIMO OFDM system with combined antenna and tone group precoding.

FIG. 11 shows a MIMO system having closed loop selection of combined antenna and tone group precoding matrices. Block 344 performs channel estimation and selection of the combined precoding and combined distribution matrices based on the channel estimation.

It is desirable to minimize the overhead cost associated with communicating selected precoding or distribution matrices between the transmitter and receiver in closed loop systems. Such minimization can be accomplished in multiple ways. One way to reduce overhead is to reduce the number of bits used to specify the matrices. Each matrix element may be more coarsely quantized to reduce the number of bits. In those embodiments having tone group precoding, the size of the tone group precoding and distribution matrices (and hence the overall number of matrix elements) may be reduced by reducing the number of tones in each tone group. The tone group precoding and distribution matrices can be entirely eliminated by employing combined tone group and antenna precoding as described in FIG. 11. The number of matrix elements in the set of antenna precoding and distribution matrices or the set of combined antenna and tone group precoding and distribution matrices can also be reduced by reducing the number of tones in each tone group. Moreover, if the matrices for adjacent tone groups are expected to be similar, the set of matrices may be efficiently compressed by using a differential encoding technique, in which each matrix is given by its difference from the previous matrix. Alternatively, the same matrix may be used for adjacent tone groups.

While certain preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A wireless transmitter comprising:
   plural input serial data bit streams;
   bit allocation blocks having inputs coupled to the input serial data streams and having outputs, the bit allocation blocks apportioning data bits among available tones and each bit allocation block outputting a quadrature amplitude modulation (QAM) constellation signal point for each tone;
   tone group precoding matrix blocks having inputs coupled to the outputs of the bit allocation blocks and having outputs, the tone group precoding matrix blocks distributing signal energy across the tone groups for each of the multiple data streams to distribute the data bits across multiple tones and maximize the communications bandwidth of the system;
   antenna precoding matrix blocks having inputs coupled to the outputs of the tone group precoding matrix blocks and having outputs, the antenna precoding matrix blocks being applied to the tones to distribute the energy of the tones across the outputs of the antenna precoding matrix blocks to distribute the data bits across multiple antennas and maximize the communications bandwidth of the system; and
   inverse fast Fourier Transform and parallel to serial blocks having inputs coupled to the outputs of the antenna precoding matrix blocks.

2. The wireless transmitter of claim 1 in which there is a separate antenna precoding matrix block for each tone.

3. The wireless transmitter of claim 1 in which there is one antenna precoding matrix block for a group of tones.

4. The wireless transmitter of claim 1 in which 256 available tones are divided into 32 groups of 8 tones each and there are 32 antenna precoding matrix blocks, one for each group.

5. The wireless transmitter of claim 1 in which the tone group precoding matrix blocks distribute signal energy equally across the tone groups for each of the multiple data streams.

6. The wireless transmitter of claim 1 in which the antenna precoding matrix blocks are applied to the tones to distribute the energy of the tones equally across the outputs of the antenna precoding matrix blocks.

7. The wireless transmitter of claim 1 in which the bit allocation blocks, the tone group precoding matrix blocks, and antenna precoding matrix blocks are free of feedback from a receiver.

8. A wireless transmitter comprising:
   plural input serial data bit streams;
   bit allocation blocks having inputs coupled to the input serial data streams and having outputs, the bit allocation blocks apportioning data bits among available tones and each bit allocation block outputting a quadrature amplitude modulation (QAM) constellation signal point for each tone;
   tone group precoding matrix blocks having inputs coupled to the outputs of the bit allocation blocks and having outputs, the tone group precoding matrix blocks distributing signal energy across the tone groups for each of the multiple data streams to distribute the data bits across multiple tones and maximize the communications bandwidth of the system;
   an antenna precoding matrix block having inputs coupled with the outputs of the tone group precoding matrix blocks and having outputs, the antenna precoding matrix block being applied to the tones to distribute the energy of the tones across the antenna precoding matrix block outputs to distribute the data bits across multiple antennas and maximize the communications bandwidth of the system;
   inverse fast Fourier Transform and parallel to serial blocks having inputs coupled to the outputs of the antenna precoding matrix blocks.

9. The wireless transmitter of claim 8 in which the tone group precoding matrix blocks distribute signal energy equally across the tone groups for each of the multiple data streams.

10. The wireless transmitter of claim 8 in which the antenna precoding matrix block is applied to the tones to distribute the energy of the tones equally across the outputs of the antenna precoding matrix block.

11. The wireless transmitter of claim 8 in which the bit allocation blocks, the tone group precoding matrix blocks, and antenna precoding matrix block are free of feedback from a receiver.

* * * * *